(12) United States Patent  
Khor

(10) Patent No.: US 7,274,845 B2  
(45) Date of Patent: Sep. 25, 2007

(54) LOW-COST METHOD AND APPARATUS FOR ESTABLISHING FIBER OPTIC CONNECTIONS

(75) Inventor: Albert Wooi Quan Khor, Singapore (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/947,428

(22) Filed: Sep. 21, 2004

(65) Prior Publication Data

US 2006/0062524 A1      Mar. 23, 2006

(51) Int. Cl.  
*G02B 6/26* (2006.01)

(52) U.S. Cl. .......................................... 385/52; 385/81

(58) Field of Classification Search ................. 385/52, 385/81  
See application file for complete search history.

(56) References Cited

U.S. PATENT DOCUMENTS

| | | | | |
|---|---|---|---|---|
| 3,655,275 A | * | 4/1972 | Seagreaves | 385/53 |
| 3,914,015 A | * | 10/1975 | McCartney | 385/54 |
| 4,021,098 A | * | 5/1977 | McCartney et al. | 385/81 |
| 4,092,396 A | * | 5/1978 | McCartney et al. | 264/249 |
| 4,132,461 A | * | 1/1979 | Jacques et al. | 385/82 |
| 4,133,601 A | * | 1/1979 | Le Guen et al. | 385/81 |
| 4,142,776 A | * | 3/1979 | Cherin et al. | 385/71 |
| 4,300,815 A | * | 11/1981 | Malsot et al. | 385/81 |
| 4,712,864 A | * | 12/1987 | Ellis et al. | 385/59 |
| 5,015,062 A | * | 5/1991 | Finzel | 385/95 |
| 5,761,360 A | * | 6/1998 | Grois et al. | 385/81 |
| 5,823,702 A | * | 10/1998 | Bynum | 403/320 |
| 5,930,426 A | * | 7/1999 | Harting et al. | 385/56 |
| 6,402,390 B1 | * | 6/2002 | Anderson et al. | 385/71 |
| 6,655,852 B2 | * | 12/2003 | Bolle | 385/82 |
| 6,786,649 B2 | * | 9/2004 | Sherrer | 385/84 |

FOREIGN PATENT DOCUMENTS

JP           360256104      * 12/1985

OTHER PUBLICATIONS

TIA/EIA Standard; FOCIS 3; "Fiber Optic Connector Intermateability Standard Type SC"; TIA/EIA-604-3A (Revision of TIA/EIA-604-3) Sep. 2000; Telecommunications Industry Association.

* cited by examiner

*Primary Examiner*—Ellen E. Kim

(57) ABSTRACT

A low-cost molded sleeve for a fiber optic cable connector receptacle is disclosed. The inner surface of the sleeve, into which a fiber optic connector can be inserted, is defined by three surfaces. A first planar surface and a second planar surface at right angles to each other form a V-shaped groove for holding the a fiber optic connector. Clamping action is applied to a third surface to hold the a fiber optic connector in place in the V-shaped groove such that optical coupling is achieved.

22 Claims, 3 Drawing Sheets

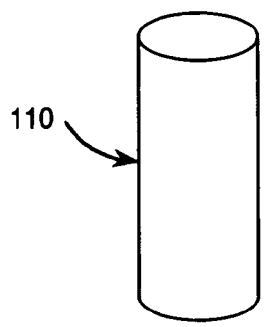 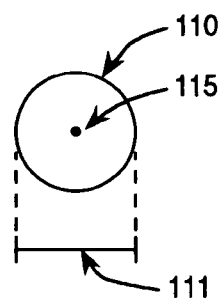
FIGURE 1A  FIGURE 1B
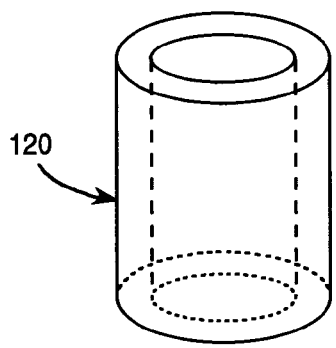 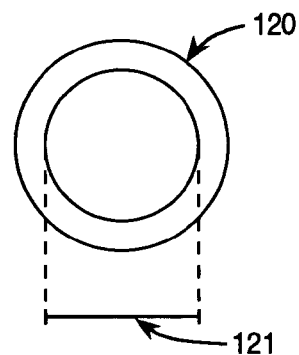
FIGURE 1C  FIGURE 1D
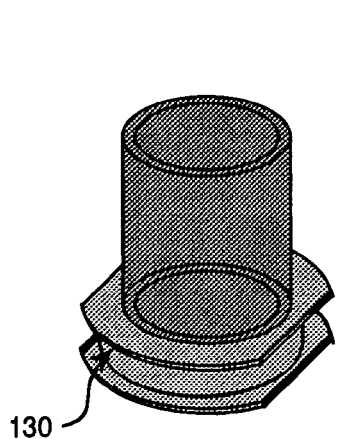 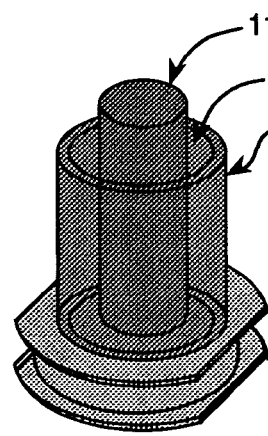 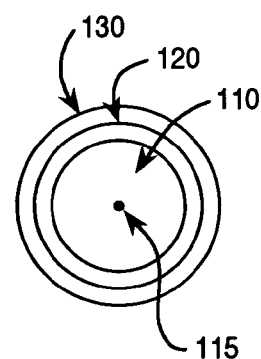
FIGURE 1E  FIGURE 1F  FIGURE 1G
(PRIOR ART)

LOW-COST METHOD AND APPARATUS FOR ESTABLISHING FIBER OPTIC CONNECTIONS

FIELD

The present invention relates to fiber optic cable connectors. More particularly, the present invention pertains to a low-cost method of establishing fiber optic connections by using a molded sleeve which is made of commonly found molding material and easily produced in mass quantities.

BACKGROUND

Fiber-optic cables are becoming the standard means of communication signal transmission. Fiber optic cables can span the long distances between local phone systems as well as computer networks, cable television services, university campuses, office buildings, industrial plants, and electric utility companies. Fiber optics systems use light pulses to transmit information down fiber lines, or patchcords. A patchcord is a length of cable with a connector terminated at both ends. At one end of the system is a transmitter. The transmitter is the place of origin for information to be conveyed along the fiber lines. The transmitter utilizes a lens to funnel light pulses from a light emitting diode or a laser into the fiber optic medium, which in turn transmits the pulses down the line.

Connectors are used to mate a fiber to another fiber or to equipment. Connectors are used when one expects that the connection must occasionally be broken. A connector marks a place along a fiber optic line where signal power can be lost and the bit error rate can be affected. A good mechanical connection is required to ensure fiber optic reliability. Good coupling efficiency requires precise positioning of the connecting fibers. Optical connectors are similar to their electrical counterparts in function and outward appearance. They must, however, be high precision devices. A connector must center the fiber so that its light gathering core lies directly over and in line with a light source or another fiber to a tolerance of a few ten thousandths of an inch.

There are many different types of optical connectors in use today. The SC type connector has emerged as one of the most popular styles. The conventional SC connector is a push/pull connector that provides for accurate alignment via a ceramic ferrule on one patchcord (or piece of equipment) which mates with a ceramic alignment sleeve on another patchcord (or piece of equipment). A ferrule is a rigid portion of a fiber optic connector used to position and protect the fiber, allowing for repeated connection and disconnection. The conventional alignment sleeve 120, as depicted in FIGS. 1C and 1D, has a round opening of a diameter 121 just a few sub-microns greater than the diameter 111 of the ferrule 110, illustrated in FIGS. 1A and 1B. The alignment sleeve 120 is secured inside the optical connector receptacle 130 (FIGS. 1E and 1F). The ferrule 110 must fit into sleeve 120 tightly enough so that the fiber within ferrule 110 is properly aligned with the fiber or light source at the other end of the connector, yet loosely enough so that it may be removed and re-inserted repeatedly without damaging the fiber within.

It is imperative that the center of the circular opening in the alignment sleeve 120 is concentric with the center of the ferrule 110, where the actual fiber 115 is located. A misalignment of only a few sub-micron distances could result in decreased optical transmission power, if not complete transmission failure. The dimensions of ferrules and alignment sleeves are set forth by the Telecommunications Industry Association (TIA)/Electronic Industries Alliance (EIA) standards for fiber optic connector intermateability.

Proper optical alignment using the conventional method is achieved by maintaining extremely low machining tolerances during fabrication. Conventionally, the alignment sleeve is manufactured from expensive zirconia. Zirconia is hard enough to allow the required tight machining tolerances. The hardness of zirconia is also desirable because ferrules can be inserted and removed from a zirconia alignment sleeve repeatedly without damage to the sleeve. However, zirconia sleeves are costly, both due to the cost of zirconia itself and to the level of precision required during fabrication. As the number of applications of optical fiber communication continues to rise, reliable yet inexpensive alignment sleeves for connectors will become more and more desirable.

SUMMARY

Embodiments of the present invention pertain to an alignment sleeve for receiving fiber optic connectors in a fiber optic connection mechanism and a method thereof. The sleeve includes a first planar surface and a second planar surface on the inside of the sleeve which together form a V-shaped groove, and a third surface which is a clamping surface. A fiber optic connector received by the sleeve in kept in place in the V-shaped groove by the clamping action to ensure precision optical alignment.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a three dimensional view of a fiber optic connector.

FIG. 1B is a cutaway view of a fiber optic connector.

FIG. 1C is a three dimensional, transparent view of a conventional alignment sleeve.

FIG. 1D is a cutaway view of a conventional alignment sleeve.

FIG. 1E is a three dimensional view of a standard fiber optic connector receptacle.

FIG. 1F is a three dimensional view of a fiber optic connector within a conventional alignment sleeve within a standard fiber optic connector receptacle.

FIG. 1G is a cutaway view of a fiber optic connector within a conventional alignment sleeve within a standard fiber optic connector receptacle.

DETAILED DESCRIPTION

Reference will now be made in detail to the preferred embodiments of the present invention, a low-cost alignment sleeve for establishing fiber optic connections, and a method for producing the same. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and material compounds have not been described in detail as not to unnecessarily obscure aspects of the present invention.

Accordingly, the present invention discloses a low-cost molded alignment sleeve for aligning fiber optic fibers within a connector that can be machined at lower tolerances and from less costly materials than conventional alignment sleeves. Also, the present invention discloses a method for precisely aligning fiber optics fibers within a connector.

Figures 2, 2A, 2B:
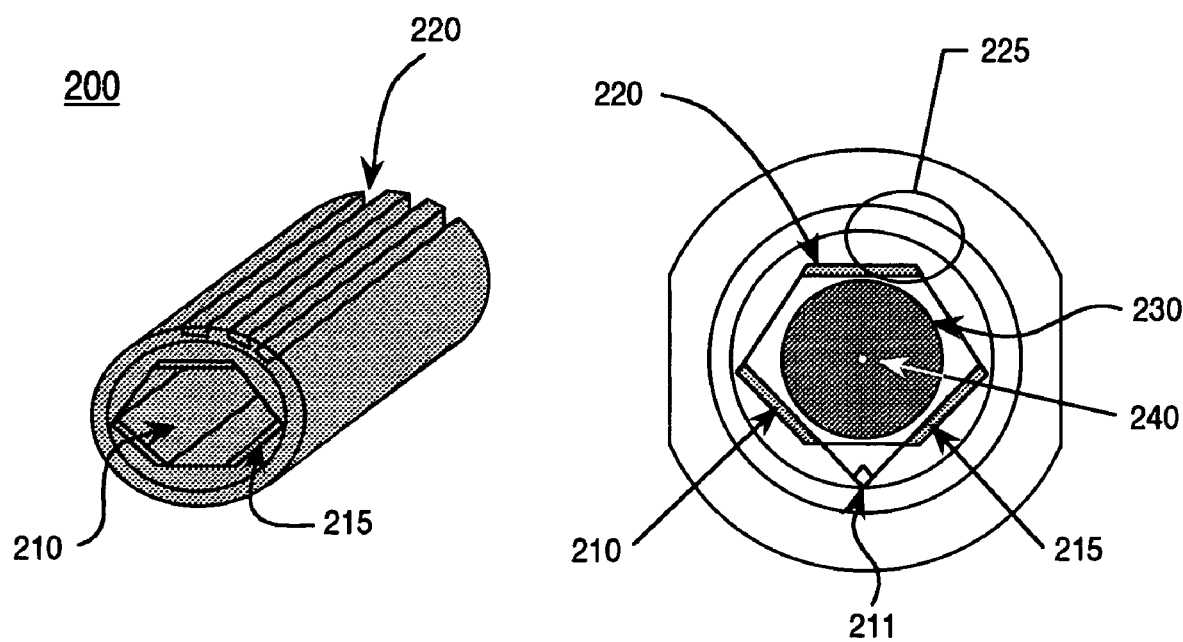
FIG. 2A is a three dimensional view of an alignment sleeve according to the preferred embodiment of the present invention.
FIG. 2B is a cutaway view of a fiber optic connector within an alignment sleeve according to the preferred embodiment of the present invention within a standard fiber optic connector receptacle.

FIGS. 2A and 2B illustrate a low-cost alignment sleeve 200. Conventional alignment sleeves have a circular interior, as depicted in FIG. 1D. The diameter 121 of the conventional circular interior must be formed using precision machining techniques in order to allow an effective push/pull connection utilized for example by Type SC fiber optic connectors. Such a connection must permit proper transmission of light pulses between aligned fiber optic fibers via precise alignment of the fiber optic connectors, or ferrules 110. Instead of having a circular interior as depicted in Prior Art FIG. 1D, the preferred embodiment of the present invention utilizes two planar surfaces 210 and 215 at right angles 211 to each other to create a V-shaped groove which the ferrule 230 fits into. Other embodiments of the present invention utilize two planar surfaces 210 and 215 situated at an angle greater than or less than 90 degrees to each other. A third clamping surface 220 keeps the ferrule 230 firmly in place for proper fiber optic alignment, as depicted in FIG. 2B. A combination of gaps, grooves, hinges, and interference dimensions 225 create a clamping action onto the ferrule 230 and force the ferrule 230 to sit firmly into the V-shaped groove formed by the planar surfaces 210 and 215.

The opening defined by the V-shaped groove and the clamping surface 220 complies with the requirements of the TIA/EIA standards for fiber optic connector intermateability. An alignment sleeve according to the preferred embodiment is capable of receiving and aligning any ferrule or fiber optic connector that complies with these standards.

Because the preferred embodiment of the present invention utilizes a V-shaped groove and clamping action to secure the fiber optic connector for proper fiber optical alignment, the machining tolerances required for fabrication can be relaxed to more than just a few microns. Alignment sleeves according to the preferred embodiment must be made of a compound hard enough to withstand repeated insertion and removal of ferrules without damage, but it is not necessary that the alignment sleeves be made of zirconia. Relaxed machining tolerances permit a wide range of acceptable compounds. In the preferred embodiment, the sleeve is formed from a compound that is less expensive than zirconia.

Figure 3:
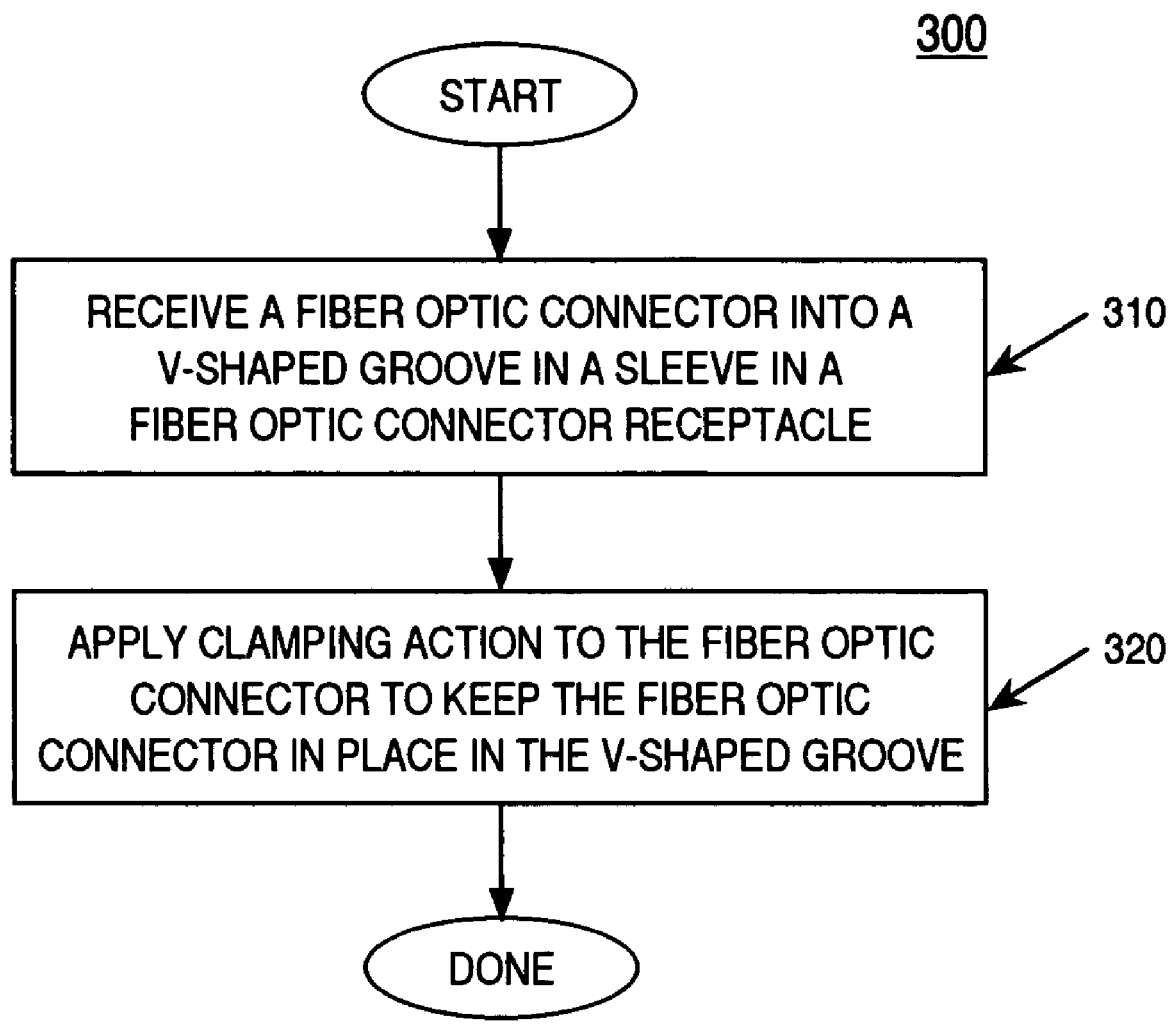
FIG. 3 is a flowchart illustrating a method for connecting fiber optic cables using a low-cost molded alignment sleeve according to embodiments of the present invention.

FIG. 3 is a flowchart illustrating the method of coupling a fiber optic connector of one end of a fiber optic cable, patchcord, or piece of fiber optic equipment with a fiber optic cable connector receptacle on the end of another fiber optic cable, patchcord or a piece of fiber optic equipment. According to step 310, a fiber optic connector is received by a V-shaped groove in an alignment sleeve within a fiber optic connector receptacle. In the preferred embodiment, the two planar surfaces which define the V-shaped groove sit at right angles to each other, as depicted in FIG. 2B. In another embodiment, the two planar surfaces which define the V-shaped groove may sit at an angle greater than or less than 90 degrees to each other.

Step 320 of FIG. 3 is applying clamping action to the fiber optic connector to keep the fiber optic connector in place in the V-shaped groove within the alignment sleeve. This is accomplished by a combination of gaps, grooves, hinges, and interference dimensions specifically designed to create a clamping action on to the fiber optic connector, e.g. a patchcord ferrule and to force the fiber optic connector to sit firmly in the V-shaped groove. Once the fiber optic connector is securely in place, the fiber within the fiber optic connector is properly in place for optimum fiber optic transmission.

In a preferred embodiment, the clamping surface through which the clamping action is applied is situated opposite the V-shaped groove within the sleeve. However, in another embodiment, the clamping surface may be situated otherwise.

The preferred embodiments of the present invention, an alignment sleeve for a fiber optic connector which receives and holds a fiber optic connector in place by the combination of a V-shaped groove and clamping action, and a method thereof, is thus described. While the present invention has been described in particular embodiments, it should be appreciated that the present invention should not be construed as limited by such embodiments, but rather construed according to the below claims.

What is claimed is:

1. An alignment sleeve for receiving a fiber optic connector in a fiber optic receptacle comprising:
    an annular cover, the external surface of which is configured with a clamping region having a first groove defined by a bottom surface;
    a first planar surface on an inside of the alignment sleeve;
    a fiber-optic connector arranged within the alignment sleeve;
    a second planar surface on the inside of said sleeve, wherein said second planar surface and said first planar surface form a V-shaped groove which said fiber optic connector resides within; and
    a third surface positioned over said V-shaped groove, wherein said third surface applies a force onto an exterior surface of said fiber optic connector towards the bottom of said V-shaped groove, wherein said force keeps said fiber optic connector fixedly in place in said V-shaped groove.

2. The alignment sleeve described in claim 1 wherein said first and second planar surfaces sit at right angles to each other.

3. The alignment sleeve described in claim 1 wherein said alignment sleeve is comprised of any moldable compound hard enough to allow multiple insertion and removal of said fiber optic connector without damage.

4. The alignment sleeve described in claim 1 wherein the dimensions of the inside of said sleeve comply with current TIA (Telecommunications Industry Association)/EIA (Electronic Industry Alliance) FOCIS (Fiber Optic Connector Intermateability Standard) dimensions.

5. The alignment sleeve described in claim 1 wherein the dimensions of the inside of said sleeve will allow said sleeve to receive any fiber optic connector which complies with TIA/EIA FOCIS dimensions.

6. The alignment sleeve described in claim 1 wherein said sleeve can be secured into a typical fiber optic connector receptacle by press fit or an adhesive.

7. The alignment sleeve described in claim 1 wherein said sleeve is secured into a standard Type SC fiber optic connector receptacle.

8. A fiber optic connector receptacle comprising:
   an annular cover, the external surface of which is configured with a clamping region having a first groove defined by a bottom surface; and
   an alignment sleeve arranged to receive a fiber optic connector, the alignment sleeve comprising:
      an enclosure encompassing a first planar surface;
      a second planar surface; and
      a third planar surface, said second planar surface and said first planar surface arranged to form a V-shaped groove while said third surface applies a force onto the fiber optic connector via features in the enclosure opposed to the third surface, said force keeping said fiber optic connector in place in said V-shaped groove.

9. The fiber optic connector receptacle described in claim 8 wherein said first planar surface and said second planar surface form a 90-degree V-shaped groove.

10. The fiber optic connector receptacle described in claim 8 wherein said alignment sleeve is comprised of any moldable compound hard enough to allow multiple insertion and removal of said fiber optic connector without damage.

11. The fiber optic connector receptacle described in claim 8 wherein the dimensions of the inside of said alignment sleeve comply with current TIA (Telecommunications Industry Association)/EIA (Electronic Industry Alliance) FOCIS (Fiber Optic Connector Intermateability Standard) dimensions.

12. The fiber optic connector receptacle described in claim 8 wherein the dimensions of the inside of said alignment sleeve will allow said sleeve to receive any patchcord ferrule which complies with TIA/EIA FOCIS dimensions.

13. The fiber optic connector receptacle described in claim 8 wherein said alignment sleeve can be secured into a typical fiber optic connector receptacle by press fit or an adhesive.

14. The fiber optic connector receptacle described in claim 8 wherein said receptacle is a standard Type SC fiber optic receptacle.

15. A method for connecting a fiber optic connector of a fiber optic cable connector receptacle comprising:
   receiving said fiber optic connector into an alignment sleeve in said connector receptacle, the alignment sleeve having an annular cover, the external surface of which is configured with a clamping region having a first groove defined by a bottom surface, wherein said alignment sleeve comprises a V-shaped groove to receive said fiber optic connector; and
   applying clamping action to said fiber optic connector via structures opposed to a clamping surface within an enclosure of the alignment sleeve, wherein the clamping surface contacts the fiber optic connector to keep said fiber optic connector in place in said V-shaped groove.

16. The method recited in claim 15, wherein said alignment sleeve is comprised of any moldable compound hard enough to allow multiple insertion and removal of said fiber optic connector without damage.

17. The method recited in claim 15, wherein the dimensions of the inside of said alignment sleeve comply with current TIA/EIA FOCIS dimensions.

18. The method recited in claim 15, wherein the dimensions of the inside of said alignment sleeve will allow said sleeve to receive any patchcord ferrule which complies with TIA/EIA FOCIS dimensions.

19. The method recited in claim 15, wherein said clamping action is accomplished by a combination of gaps, grooves, hinges, and interference dimensions for clamping said fiber optic connector and forcing said fiber optic connector to sit firmly in said V-shaped groove.

20. The alignment sleeve described in claim 1 wherein said sleeve is comprised of zirconia.

21. The alignment sleeve described in claim 1 wherein the first groove is oriented in a direction parallel to insertion of said fiber optic connector.

22. The alignment sleeve described in claim 8 wherein the first groove is oriented in a direction parallel to insertion of said fiber optic connector.

* * * * *